Nov. 11, 1969     C. H. McGREARY     3,477,311
TORSIONAL VIBRATION DAMPER
Filed June 25, 1968     2 Sheets-Sheet 1
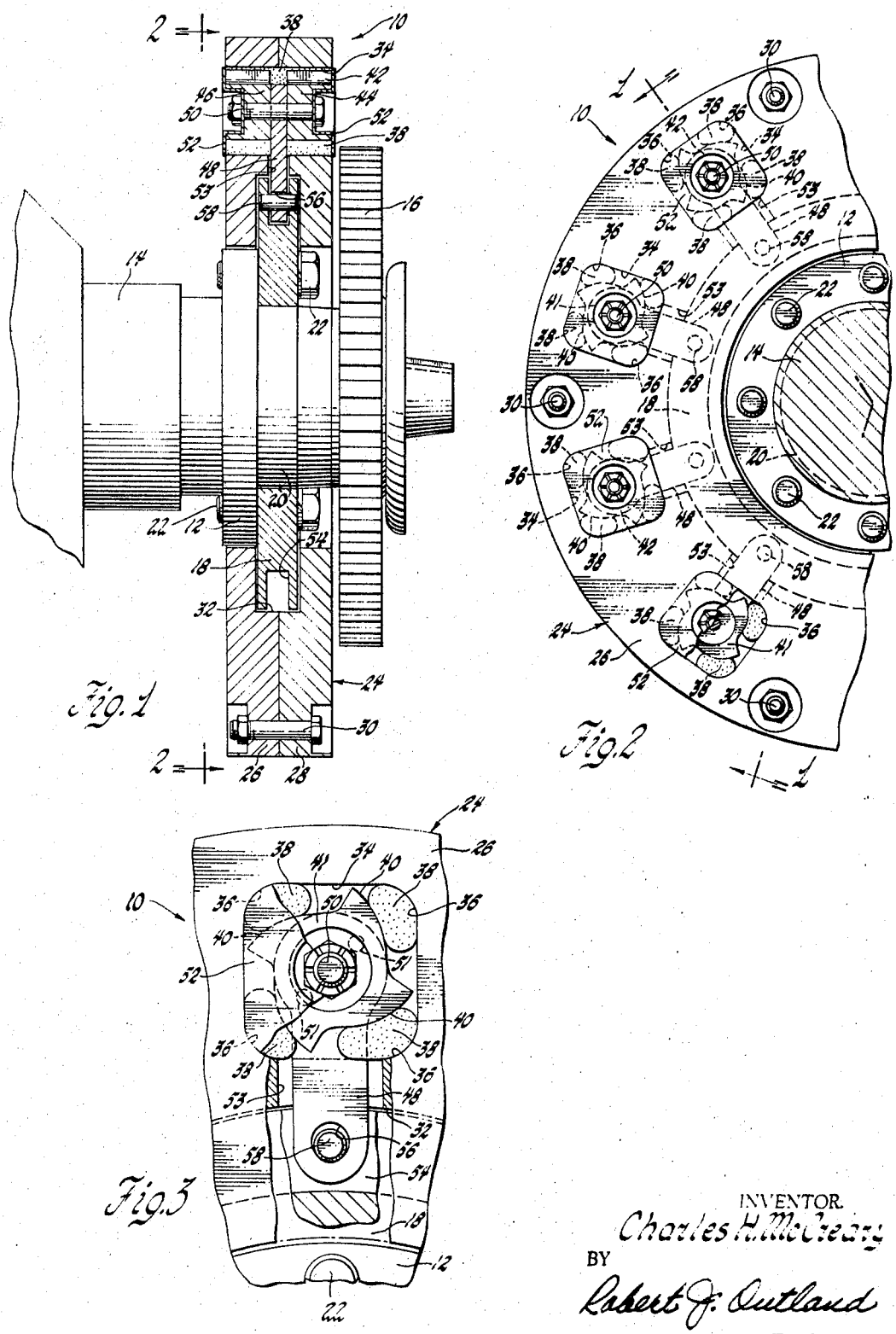
INVENTOR.
Charles H. McCreary
BY
Robert J. Outland
ATTORNEY Nov. 11, 1969   C. H. McGREARY   3,477,311
TORSIONAL VIBRATION DAMPER
Filed June 25, 1968  2 Sheets-Sheet 2
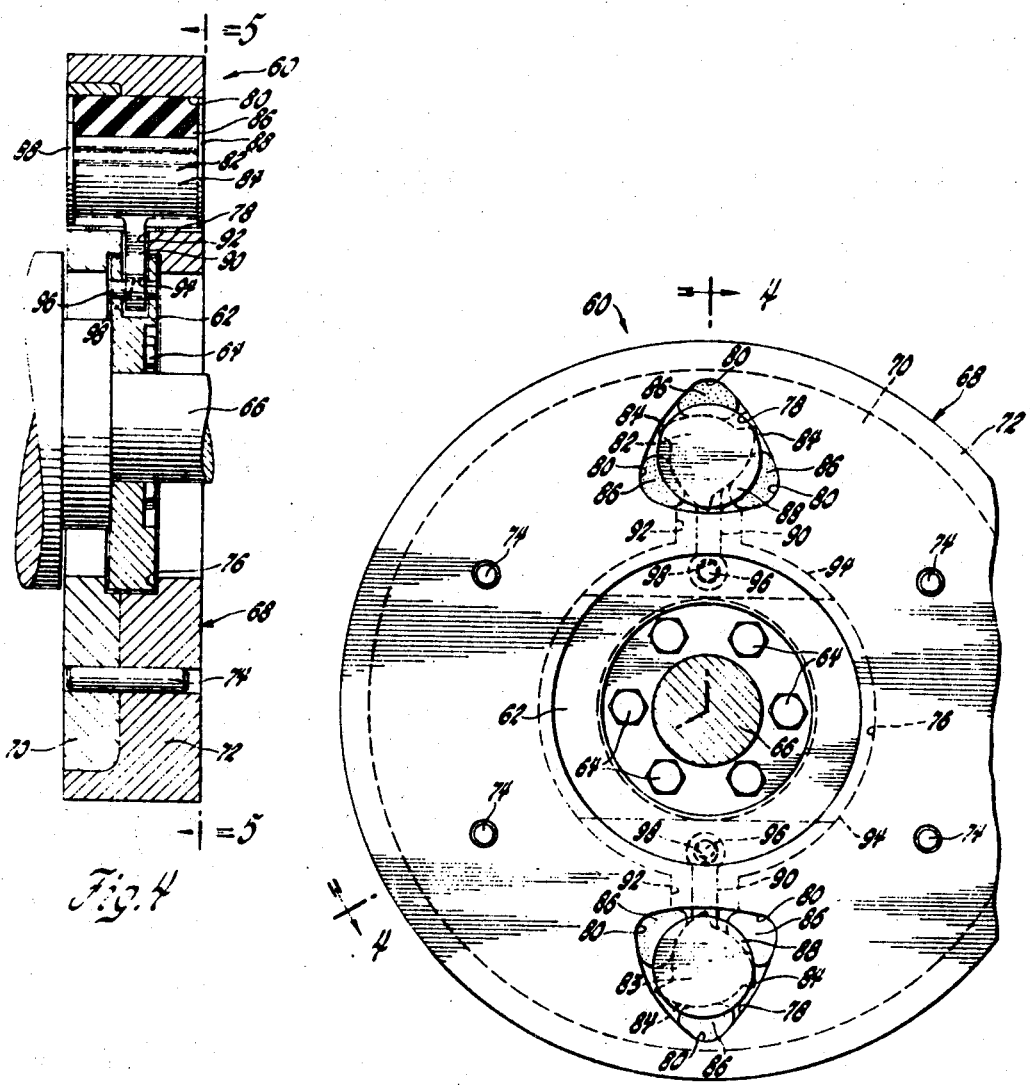
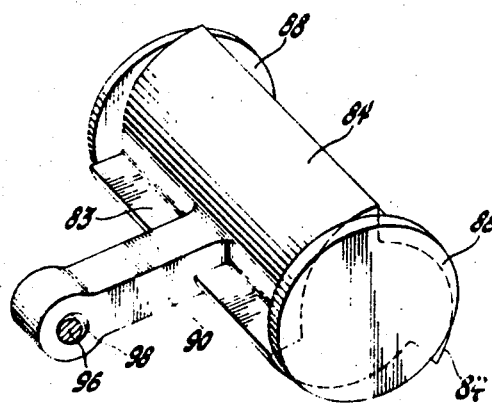
INVENTOR.
Charles H. McCreary
BY
Robert J. Outland
ATTORNEY

United States Patent Office 3,477,311
Patented Nov. 11, 1969

3,477,311
TORSIONAL VIBRATION DAMPER
Charles H. McGreary, Oak Park, Ill., assignor to General Motors Corporation, Detroit, Mich., a corporation of Delaware
Filed June 25, 1968, Ser. No. 739,834
Int. Cl. F16f 15/12
U.S. Cl. 74—574      4 Claims

ABSTRACT OF THE DISCLOSURE

A torsional vibration damper having, in a preferred embodiment, lever-cam means connecting the hub with the inertia member through elastic elements compressed into the corners of polygonal pockets formed in the inertia member. Oscillation of the inertia member on the hub is resisted and damped by the action of the lever-cam means acting to compress the elastic elements.

Field of the invention

This invention relates to torsional vibration dampers particularly of the type intended for damping vibrations in the crankshaft of an internal combustion engine. More particularly, the invention proposes vibration damper arrangements wherein elastic elements are loaded in compression to resist and damp oscillation of an inertia member on a hub while permitting a high degree of flexibility in the provision of damping characteristics.

Description of the prior art

Many types of torsional vibration dampers for internal combustion engines are known in the prior art. Among the simplest of these are the three-piece constructions utilizing a rubber or other elastic element held between an annular inertia member and a hub which may be fixed to the crankshaft of an engine or other member requiring torsional damping. While such dampers may be satisfactory for many purposes, their design depends on the characteristics of the elastic element including its strength and rate in shear to determine the damping characteristics of the assembly. Other damper designs provide elastic members loaded in compression between the inertia member or members and the hub. Such dampers tend to be relatively stiff depending, of course, on the characteristics of the elastic members, primarily their compressive rate, to determine damping characteristics.

Summary of the invention

The present invention proposes a torsional vibration damper in which rubber or other elastic members are loaded in compression but which possesses an unusual degree of design flexibility. Essentially, the damper comprises a hub carrying an inertia member with a plurality of lever-cams acting against elastic elements so as to alternately compress and relieve compression on the elements upon oscillatory movement of the inertia member on the hub.

The characteristics of this damper are determined in part by the rate in compression and the internal damping coefficient of the elastic members, but the damper characteristics also depend on the lever lengths and cam contours as well as the number of lever-cam units and/or the number of cams and elastic elements used with each unit. This gives a basic design having the capability of being easily modified for almost any desired damping characteristic.

These and other advantages of the invention will be more apparent from the following description of preferred embodiments of the invention taken together with the accompanying drawings.

Brief description of the drawings

In the drawings:
FIGURE 1 is a cross-sectional view taken in the plane indicated by the line 1—1 of FIGURE 2 and showing a torsional vibration damper formed according to the invention and particularly intended for use with a large internal combustion engine;
FIGURE 2 is a fragmentary end elevation of the damper of FIGURE 1 taken in the plane indicated by the line 2—2 of FIGURE 1 and viewed in the direction of the arrows;
FIGURE 3 is an enlarged view of a portion of FIGURE 2 showing one of the lever-cam mechanisms and its elastic elements;
FIGURE 4 is a cross-sectional view taken in the plane indicated by the line 4—4 of FIGURE 5 showing an alternative embodiment of a torsional vibration damper particularly intended for use with a relatively light-weight internal combustion engine;
FIGURE 5 is an end elevation of the damper of FIGURE 4 taken in the plane indicated by the line 5—5 of FIGURE 4 and viewed in the direction of the arrows; and
FIGURE 6 is a pictorial view of one of the lever-cam mechanisms used in the vibration damper embodiment of FIGURES 4 and 5.

Description of the preferred embodiments

Referring now to FIGURES 1 through 3 of the drawings, there is shown a torsional vibration damper generally indicated by numeral 10. Damper 10 is shown mounted on a flange 12 adjacent the end of the crankshaft 14 of an internal combustion engine. Mounted on the crankshaft, outboard of the damper is an accessory drive gear 16 which forms no part of the vibration damper construction.

Vibration damper 10 comprises a hub member 18 which fits over a reduced diameter 20 of the crankshaft and is secured to flange 12 by a plurality of bolts 22. Hub 18 carries on its periphery an annular inertia member 24 which is made up of two mating portions 26 and 28 held together by retaining means such as bolts 30. An internal annular groove 32 in the inertia member 24 encloses the periphery of hub 18, retaining the inertia member on the hub and permitting relative rotation between the hub and inertia member.

Annularly spaced around the inertia member are ten four-sided polygonal openings or pockets 34. The pockets extend through both portions of the inertia member in an axial direction and are equiangularly spaced therearound. Pockets 34 have radiused corners 36 in which are received elastic elements 38 which, in their free state, comprise cylinders of circular cross-section. However, as shown in the drawings, elements 38 are compressed against the corners and sides of the pockets 34 by the cam surfaces 40 of alternately disposed right and left hand cam members 41, 42, respectively. Cam members 41, 42, as shown, each include right and left sections 44, 46, respectively, which are non-rotatably secured to a lever member 48 by securing means 50 and pins 51. A pair of sheet metal retainers 52 are secured on the outer surfaces of the sections 44, 46 to hold elastic elements 38 in position within the pockets.

The lever members 48 extend inwardly through slots 53 in the inertia member 24 into an outwardly facing annular groove 54 provided in the hub 18. Over-size openings 56 are provided in the ends of lever members 48 which receive pins 58 secured in the hub so as to connect and retain the ends of the lever members in place in the hub.

In operation, torsional vibrations of crankshaft 14 cause hub 18 to oscillate with respect to inertia member 24. The relative rotation of the hub and inertia members acts through lever members 48 to rotate cam members 41, 42, alternately increasing and reducing the compression of elastic elements 38. The over-size holes 56 in the levers permit rotation of the cam members without displacing them from the centers of the pockets 34. The resilient characteristics of elements 38 act against the right and left hand cam member surfaces so as to urge the inertia member toward a predetermined centered position. Thus, the elastic elements tend to oppose relative rotation of the hub and inertia members from their centered position. In addition, the internal friction of the elastic material provides damping which reduces the oscillating motion.

The damping characteristics may be varied by changing the lengths of levers utilized or the form of cam surfaces acting against the elastic elements as well as the number of cam members and elastic elements used. In addition, the characteristics of the elastic elements themselves determine, in part, the damping characteristics of the vibration damper.

Referring now to FIGURES 4 through 6 of the drawings, there is shown an alternative embodiment of a torsional vibration damper generally indicated by numeral 60. Damper 60 comprises a hub 62 which is secured by bolts 64 to the crankshaft 66 of an internal combustion engine. On the outer periphery of hub 62 is retained an inertia member 68 formed of a small and a large section 70 and 72, respectively, connected by a plurality of pins 74. An internal groove 76 formed in inertia member 68 encloses the outer periphery of hub 62 holding the inertia member in place thereon but permitting relative rotation with respect thereto.

Extending axially through the hub are a pair of oppositely disposed three-sided polygonal openings or pockets 78 having radiused corners 80. Within one of the pockets 78 is a right hand cam member 82 while the other pocket 78 surrounds a left hand cam member 83. Both cam members include cam surfaces 84 engaging and compressing cylindrical elastic members 86 into the corners 80 of the openings or pockets 78. Cam members 82, 83 further include radially extending retainer portions 88 on their outer ends and lever portions 90 extending radially from their centers. Lever portions 90 extend through slots 92 of the inertia member into cooperating slots 94 of the hub and into engagement with pins 96. The pins 96 are secured in the hub and extend through enlarged openings 98 formed in the ends of lever portions 90.

The operation of the embodiment of FIGURES 4 through 6 is identical to that of FIGURES 1 through 3, the only difference being in the number of lever-cam units and elastic members utilized and in certain constructional details which do not affect its operation. Accordingly, further description is not believed necessary.

It should be apparent that various forms of cam shapes and numbers of elastic elements in pockets of varying numbers of sides may be utilized to change the characteristics of dampers according to the present invention to suit a multitude of varying engine damping requirements. Thus, the invention has provided a damper construction having an unusual degree of flexibility in design while retaining a relatively simple construction.

Since numerous changes from the embodiments disclosed may be made within the spirit and scope of the inventive concepts taught herein, it is intended that the invention not be limited to the specific embodiments shown and described but that the invention be given a scope consistent with the language of the following claims.

I claim:
1. A torsional vibration damper comprising:
   a hub member,
   an inertia member rotatably carried by said hub member,
   a plurality of elastic elements carried by one of said hub and inertia members and
   lever-cam means between said hub member and said inertia member and operative upon relative rotation of said members to compress at least certain of said elastic elements,
   whereby relative oscillation of said members is both resiliently resisted and damped by said elastic elements.

2. A torsional vibration damper comprising:
   a hub member,
   an annular inertia member rotatably carried on the outer periphery of said hub member and having a plurality of polygonal pockets therein,
   a plurality of elastic elements received in the corners of said pockets,
   cam means in each of said pockets and engaging said elastic elements, said cam means being arranged to compress said elastic elements upon rotation within said pockets in at least one direction and
   lever means extending from said cam means and connected with said hub so as to rotate said cam means in said pockets in response to relative rotation of said hub and inertia members
   whereby relative oscillation of said members is both resiliently resisted and damped by said elastic elements.

3. The combination of claim 2 wherein certain of said cam means are arranged to compress their respective elastic elements upon relative rotation in one direction of said hub and inertia members while the remainder of said cam means are arranged to compress their respective elastic elements upon relative rotation in the opposite direction of said hub and inertia members.

4. The combination of claim 3 wherein said elastic elements are cylindrical in their free state and said vibration damper further includes retainers disposed on the ends of said cam means and extending radially to retain said elastic elements in the corners of said pockets and pin means in said hub member extending through over-size openings in said lever means to pivotally connect said lever means to said hub while permitting a limited degree of freedom for axial motion of said lever means with respect to said hub.

References Cited

UNITED STATES PATENTS

| 1,627,917 | 5/1927 | Masury | 74—574 |
| 2,398,722 | 4/1946 | Rubissow | 74—574 |
| 2,446,942 | 8/1948 | McFarland | 74—574 XR |
| 3,410,369 | 11/1968 | Ishizuka | 188—1 |

FRED C. MATTERN, Jr., Primary Examiner

F. D. SHOEMAKER, Assistant Examiner

U.S. Cl. X.R.

188—1

PO-1050
(5/69)

UNITED STATES PATENT OFFICE
CERTIFICATE OF CORRECTION

Patent No. 3,477,311      Dated November 11, 1969

Inventor(s) Charles H. McCreary

It is certified that error appears in the above-identified patent and that said Letters Patent are hereby corrected as shown below:

In the headings of Sheets 1 and 2 of the drawings, for "C. H. McGreary" read --C. H. McCreary--.

In the specification, Column 1, Line 3, for "Charles H. McGreary" read --Charles H. McCreary--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents